(No Model.)
N. BARRY, Jr.
TRAP SCREW.
No. 577,343. Patented Feb. 16, 1897.
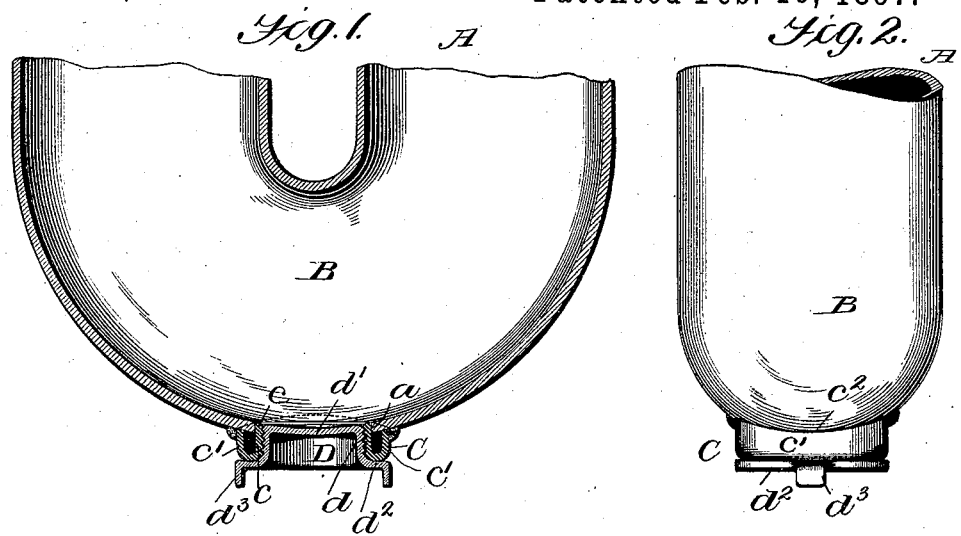
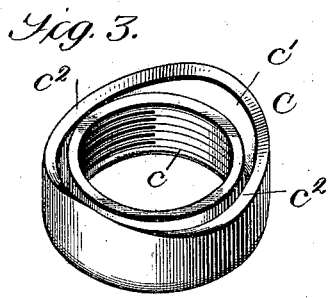
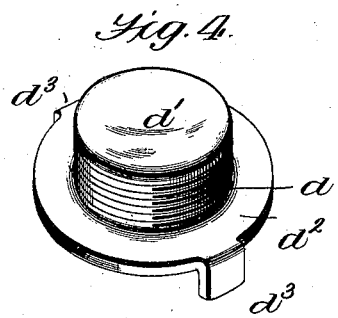
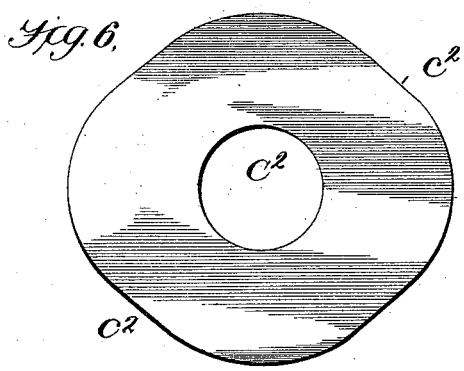
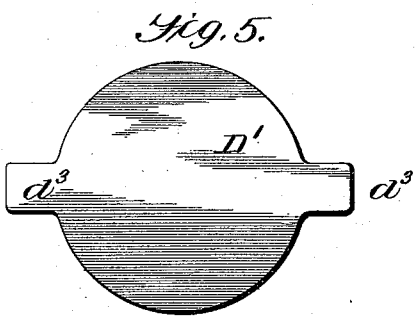
WITNESSES
Jos. C. Stack.
James R. Mansfield
INVENTOR
Nicholas Barry Jr.
by
Alexander & Dowell
Attorneys.

UNITED STATES PATENT OFFICE.

NICHOLAS BARRY, JR., OF MUSCATINE, IOWA.

TRAP-SCREW.

SPECIFICATION forming part of Letters Patent No. 577,343, dated February 16, 1897.

Application filed January 21, 1896. Serial No. 576,266. (No model.)

*To all whom it may concern:*

Be it known that I, NICHOLAS BARRY, Jr., of Muscatine, in the county of Muscatine and State of Iowa, have invented certain new and useful Improvements in Trap-Screws; and I do hereby declare that the following is a full, clear, and exact description thereof, reference being had to the accompanying drawings, and to the letters of reference marked thereon, which form part of this specification.

This invention is an improvement in what are technically known to plumbers as "trap-screws," and its object is to make a trap-screw which can be quickly and accurately fitted in position, which will not obstruct the passage of water, &c., through the trap or vessel to which it is attached, and which will not form a sink or hollow in the trap.

Further objects of the invention are to make the trap-screw in such form that it can be economically made out of sheet metal and to make the trap-screw ring also of such form that it can be readily stamped out of sheet metal, though of course it may be cast.

The invention therefore consists in the novel construction and combination of parts hereinafter claimed and illustrated and described in detail as follows:

In the drawings, Figure 1 is a vertical section through part of a plumber's trap to which my improved trap-screw and ring are attached. Fig. 2 is a vertical side view thereof. Fig. 3 is a perspective view of the ring. Fig. 4 is a similar view of the screw. Fig. 5 is a view of the blank from which the screw is stamped; Fig. 6, a similar view of the blank from which the ring is stamped.

The trap A is of any desired construction, having the water-seal portion B, in the bottom of which the trap-screw is placed, so that the seal and trap may be conveniently cleansed at any time.

As ordinarily constructed an internally-threaded ring is soldered to the trap around or in an opening in the bottom thereof, and a cast-metal trap-screw or plug is screwed into the ring, so as to prevent escape of water; but these trap-screws either project into and above the bottom of the trap, so as to obstruct the passage of material therethrough and eventually by catching and collecting material dam the trap, or the screws lie below the bottom of trap and form a small sink therein, in which solids, &c., catch and collect until the trap is choked.

I have improved on the old devices both in the form and mode of construction of both the ring and trap-screw.

The ring C is peculiar, in that it has an inner internally-threaded annular portion $c$, surrounded by an exterior annular portion $c'$, the two portions being connected at bottom, so that the ring is U-shaped in cross-section. The outer portion $c'$ is also slightly dished out on opposite sides, as at $c^2$, so that it will fit closely against the rounding exterior surface of the bottom of the trap A, as shown.

The hole $a$ is cut in the bottom of the trap at the point where the trap-screw is to be inserted, the hole being just large enough to fit the end of portion $c$ of the ring, and all the workman has to do in order to get the ring truly in place is to slip the end of portion $c$ into the hole and turn the ring until portion $c$ fits neatly against the surface of the trap, where it is secured by solder. By this construction the ring is practically made self centering or truing and the end of portion $c$ lies about flush with the bottom of the trap.

The ring may be stamped by suitable dies out of an annular sheet-metal blank $C^2$. (Shown in Fig. 6.)

The trap-screw or stopple D is stamped out of a blank D'. (Shown in Fig. 5.) An annular threaded portion $d$, which is closed at its upper end by a concaved portion $d'$ and has an outwardly-flaring flange $d^2$ at bottom, and from said flange depend two opposite lugs $d^3$, by which the stopple can be turned by a stick or wrench. When screwed into the ring, the top portion $d'$ of the stopple comes flush with the inner surface of the bottom of the trap, and thus no obstruction or sink is made in the trap by the trap-screw whereby lodgment of material will be caused.

I am aware that stopples or caps have been made for powder-boxes somewhat like my stopple but having milled edges, and I know that cast-metal stopples have been formed with lugs; but I believe that I am the first to make a stopple for trap-screws of stamped metal with lugs for applying or unscrewing them, and also the first to make the self-centering ring for trap-screws, as above described.

Having thus described my invention, what I claim as new, and desire to secure by Letters Patent thereon, is—

1. The combination of the trap, with a hard-metal ring having an inner threaded portion adapted to come flush with the interior surface of the trap and an exterior centering or setting portion adapted to fit against the outer face of the trap, substantially as described.

2. A hard-metal self-centering ring for trap-screws, U-shaped in cross-section, having its interior annular portion screw-threaded and adapted to project through the trap-hole opening and come flush with the inner surface of the trap, and its external annular portion being adapted to fit against the exterior surface of the trap so as to center the ring in place, substantially as described.

3. The herein-described ring C for plumbers' trap-screws having an interior threaded portion $c$, and an exterior portion $c'$ connected at their lower edges by an integral metal web, and an exterior portion having its upper edges dished at opposite sides to fit the curved outer surface of the trap, substantially as described.

4. The herein-described trap-screw, having an annular threaded portion $d$, closed at top by an integral portion $d'$, and having a horizontally-projecting flange $d^2$ at its lower edge and lugs $d^3$ projecting from the edge of said flange, all formed integral from sheet metal by stamping, substantially as and for the purpose described.

5. The combination of the trap having an opening in its bottom, a double-walled ring having an inner annular threaded portion $c$ fitted to the opening of the trap and having its edge flush with the interior thereof, and having an exterior annular portion $c'$ connected to and surrounding portion $c$, and fitting closely against the curved exterior surface of the trap and secured thereto; and the stopple F, having a concave top $d'$ adapted to come flush with the interior of the trap, all substantially as and for the purpose set forth.

In testimony that I claim the foregoing as my own I affix my signature in presence of two witnesses.

NICHOLAS BARRY, JR.

Witnesses:
E. M. SONDALL,
G. M. LAMBERT.